United States Patent [19]
Rossignac et al.

[11] Patent Number: 5,027,292
[45] Date of Patent: Jun. 25, 1991

[54] MULTIPLE DEPTH BUFFERS FOR GRAPHICS AND SOLID MODELLING

[75] Inventors: Jaroslaw R. Rossignac, Ossining; David A. Epstein, New York; Nader Gharachorloo, Ossining; Frederik W. Jansen, North Tarrytown; Christos S. Zoulas, Ithaca, all of N.Y.

[73] Assignee: International Business Machines Corporation, Armonk, N.Y.

[21] Appl. No.: 340,322

[22] Filed: Apr. 19, 1989

[51] Int. Cl.$^5$ .............................................. G06F 3/153
[52] U.S. Cl. ................................... 364/522; 340/723; 340/729
[58] Field of Search ............... 364/518, 521, 522, 200, 364/900; 340/720, 723, 727, 729, 750, 747

[56] References Cited

U.S. PATENT DOCUMENTS

| | | | |
|---|---|---|---|
| 4,649,498 | 3/1987 | Kedem et al. | 364/518 |
| 4,736,306 | 4/1988 | Christensen et al. | 364/522 X |
| 4,821,214 | 4/1989 | Sederberg | 364/521 X |
| 4,858,149 | 8/1989 | Quarendon | 364/522 |
| 4,888,583 | 12/1989 | Ligocki et al. | 364/521 X |

Primary Examiner—David L. Clark
Attorney, Agent, or Firm—Perman & Green

[57] ABSTRACT

A CSG solid modelling system 10 has a triple z-buffer architecture. For each pixel stored in a pixel memory 12 there are five storage entries grouped into five buffers including a front z-buffer (F) 16 which is employed to store the depths of a front face for a currently processed z-connected product, a back z-buffer (B) 18 which is employed to store the depths of a back face for the currently processed z-connected product and a final z-buffer (Z) 20 which stores the front faces of a displayed solid. Two other buffers are an intensity buffer (T) 22 for storing the intensities associated with the front face of the current z-connected product and a final intensity buffer (I) 24 for storing the intensities of the visible faces of the displayed solid. A bus 26 couples these various buffers together and to a processor 28 which may be a central processing unit or a peripheral processor. The system provides for a solid represented by any CSG tree to be represented as a union of z-connected products and that these z-connected products be expressed as intersections of z-connected sweeps. Furthermore it is shown that expressions of z-connected products in terms of sweeps are extracted directly from a CSG tree. Variations of the display methods may be used to detect interferences and differences between solids defined in CSG.

18 Claims, 10 Drawing Sheets

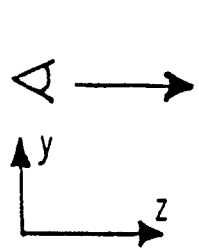
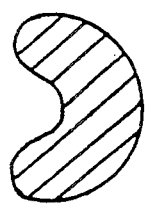
FIG. 7a
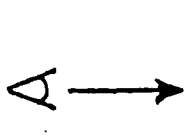
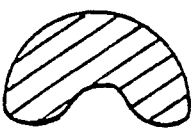
FIG. 7b
FIG. 8a
FIG. 8b
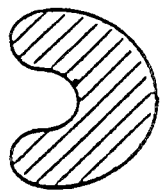
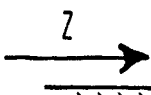
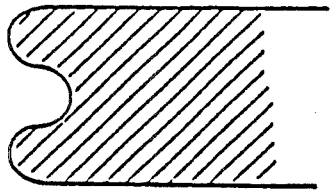
FIG. 8c
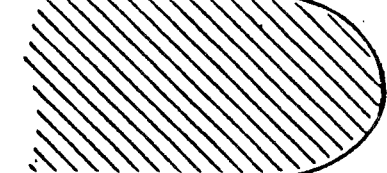
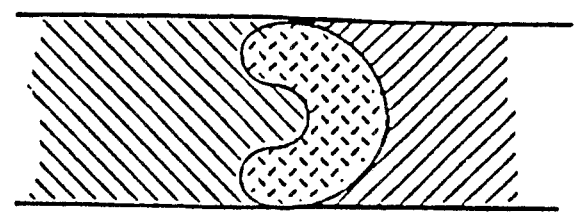
FIG. 9

```
REPLACE EACH NON Z-CONNECTED
PRIMITIVE VOLUME BY A UNION OF
Z-CONNECTED SUB-VOLUMES.
         ↓
REPLACE EACH PRIMITIVE VOLUME
BY THE INTERSECTION OF THE FRONT
SWEEP AND THE BACK SWEEP
         ↓
REPLACE EACH DIFFERENCE OPERATOR
BY AN INTERSECTION OPERATOR
AND COMPLEMENT ITS RIGHT SUBTREE
```

MULTIPLE DEPTH BUFFERS FOR GRAPHICS AND SOLID MODELLING

FIELD OF THE INVENTION

This invention relates generally to computer graphics and solid model generation and, in particular, to apparatus and method for generating realistically shaded pictures or images of solids defined in Constructive Solid Geometry (CSG) as Boolean combinations of simple primitive volumes.

BACKGROUND OF THE INVENTION

Solid Modelling systems play an increasingly important role in the design of manufactured parts and of manufacturing processes. These systems provide users with both interactive design tools which considerably reduce the cost of design activity and also with simulation and analysis tools which shorten the design cycle and improve the quality of the final products and the efficiency of manufacturing processes.

A solid can be described in terms of its boundary as a list of the types, positions, and dimensions of all of the solids' faces. However, such a description is in general too "verbose" for humans, who prefer to design solids in a hierarchical and incremental manner by combining or altering previously defined subsolids. Many such combinations of subsolids are precisely specified through Boolean set theoretic operations. For example, assembling two parts into a single solid can be modelled mathematically as a set theoretic union. Further shape modifications that produce specific geometric features, such as slots, holes and bosses, are often formulated in terms of set theoretic unions and differences between the solid to be modified and simple primitive volumes, such as cylinders or blocks, to be added to or subtracted from the solid.

A solid model is often employed to represent and analyze the geometric effects of certain manufacturing operations such as material removal by milling and drilling. Such geometric effects can also be expressed in terms of set theoretic operators as, for example, the difference between a part and a region swept by a cutter. Applying a sequence of such operations is an effective method of simulating a machining process. Given the trajectory of a cutter, a solid modeller can be used to verify that the cutter does not collide with fixtures, and also to compute how much material is removed during each motion of the cutter. Such an analysis is important for planning efficient and error free manufacturing processes. The analysis requires the ability to compute Boolean set intersections between solids and to check whether such an intersection is empty or not.

Similarly, the probability of being able to assemble several parts can be analyzed with a solid modeller by producing a large number of models of each part to be assembled, according to specified form and position tolerances, and then determining in which cases the models interfere. Generally, two solids are considered to interfere if and only if their set theoretic intersection is a non-empty three dimensional set.

Many applications, including the simulation of machining processes, require a determination as to whether two representations define identical systems. For example, it is important to verify that a solid model obtained by simulating the effect of the metal cutting operations on a piece of stock is identical to a solid model of the finished desired part.

In all of these important applications a solid model, which can represent parts, tools or characterize the effect of manufacturing operations, can be specified by combining subsolids or primitive volumes through set theoretic Boolean operations such as the union, intersection, and difference of sets. Such a solid is represented by a set theoretic Boolean expression which can be efficiently stored within a computer memory in a binary tree representation. FIG. 1 is an illustrative binary tree representation of a solid (1) which is composed of the union of two subsolids (2) and (3). Subsolid (3) is composed of the difference between the block primitive (4) and the cylindrical primitive (5). The form of such a tree is directly obtained by parsing the Boolean expression (2) +((4)-(5)). The root of the tree (solid 1) is associated with the solid defined by the Boolean expression. Internal nodes of the tree correspond to Boolean operations and are associated with subsolids. Leaves of the tree are associated with primitive volumes, which often are the intersection of relatively simple algebraic half-spaces, that is, regions of space where a simple polynomial function of three space coordinates has a non-positive value. For example, a ball of radius R centered at the origin is a half-space defined by the function $x^2+y^2+z^2-R^2 \leq 0$. An arbitrarily positioned and oriented primitive volume can be described in terms of a rigid motion transformation, a combination of a rotation with a translation, and of a congruent primitive volume defined in a convenient local coordinate system. Simple primitive volumes can be represented by their type, such as sphere, cylinder or cone, and by a relatively few intrinsic parameters such as radius, length and apex angle. Such a tree is known as a Constructive Solid Geometry representation, and will be abbreviated hereinafter as CSG.

The positions and dimensions, or intrinsic parameters, of the primitive volumes may be expressed in terms of a few primary parameters which characterize a particular member in an entire family of solids represented by the CSG tree. The resulting parameterized CSG representation can therefore be conveniently used to model, for example, an assembly of parts whose dimensions vary within tolerance limits and thus be employed to model and solve the problems described earlier.

It is often convenient to decompose the design activity into a series of steps that incrementally construct the final solid model either by merging subsolids or by modifying them through the addition of details such as the creation of geometric features, blends, and fillets. However, such a complex process can rarely be accomplished without human error and often becomes a trial-and-error process where the designer goes through each step, checks the result, and makes adjustments if necessary. Such adjustments may be limited to the alteration of the value of a parameter or may require the modification of the structure of the particular CSG tree.

Consequently, the efficiency of the interactive process of designing geometric shapes is heavily dependent on visual verification. The designer must be able to immediately visually inspect on a display device the result of a particular design or adjustment step. Not only should changes to the CSG parameters and structure be reflected immediately on a screen but the designer must further have the capability of rotating the displayed object and zooming on detail in an interactive manner. To be useful, the displayed images must be clear and unambiguous. In this regard, results are enhanced with shaded images in which important shape and orientation information is conveyed by displaying the intensity of light reflected by the faces of the solid. It is noted that the correct modelling of shadows adds realism and visual clues. However, shadow modelling is not generally considered to be essential for designing parts and analyzing manufacturing processes and will not be further discussed herein.

As described above, assembly analysis and simulation of manufacturing processes are based on repetitive detection of solid interferences, which involves testing as to whether an intersection of two solids corresponds to an empty set, and also of differences between solids, which involves testing as to whether a symmetric difference of two solids corresponds to an empty set. These tests cannot be performed by visual inspection in cases where the solids are complex and, even for simple solids, the highly repetitive nature of the analysis makes its automation essential. It is therefore important that the tasks of detecting differences and interferences be performed efficiently and automatically by a computer system.

One problem associated with generating a shaded image from a complicated CSG model is that the process involves a vast amount of calculations and data manipulations. Shading programs that run on general purpose computers perform too slowly for interactive design and their use results in a sub-optimal utilization of the designers' time. Dedicated hardware for performing a portion of the display task is known to be commercially available but is not adequate for processing CSG models. In most cases such dedicated hardware must be further combined with software preprocessing operations, which typically decreases the performance of the dedicated hardware beyond limits acceptable for interactive design.

In order to make more apparent the benefits provided by the invention, there will now be given a description of some known techniques that have been developed for producing shaded images of solid models. As will become apparent, an implementation of these techniques on a general purpose computer results in performance which is inadequate for interactive design. Also described are the deficiencies of known approaches based on special purpose hardware.

Facilities for producing shaded pictures of planar or curved faces are available in graphic workstations that provide a polygon filling technique with Gouraud or Phong shading. Solid modeller software provides a compact description of each face of the solid, for example the coordinates of the corners of a polygon in space, and the workstation paints on a display screen a shaded image of the face. The colors and intensities are chosen to indicate the amount of light that would be reflected by the face, given the user defined position(s) of the light source(s) and the user defined position of the viewpoint in the model space. By changing the position of the viewpoint, the user may, for example, see the back of the displayed object or may zoom in on certain details.

In such a system, the display screen is decomposed into a large number of pixels or image picture elements. To display a shaded image of a face on the screen, those pixels covered by the projection of the face must be colored appropriately. These pixels are determined using a model of the screen in the object space and dividing that screen model into small rectangles, each of which is associated with a pixel of the real screen. As can be seen in FIG. 2 a point of a face "covers", or is viewed through a pixel if, in the model space, the line that joins the corresponding point with the viewpoint intersects the model of the screen at the corresponding rectangle. When a face is displayed, the previous coloration of the covered pixels is discarded. A given pixel may be covered by the projections of several faces of a solid model, however only the visible faces, which are closest to the viewpoint, should be displayed while the "hidden faces" should be eliminated. There are several known techniques for eliminating such hidden faces or surfaces.

In regards to front and back faces and referring to FIGS. 3a–3d, one technique assumes that a normal at each interior point of a face is oriented towards the outside of the solid. Given a viewpoint, the faces of a model are divided into two disjoint sets, namely a set consisting of front faces and a set consisting of back faces. This division may require splitting some curved faces, such as a sphere, into disjoint subsets. At each point of a front face the normal is pointing towards the viewpoint in that the angle between the normal and a direction towards the viewpoint is less than 90 degrees. At each point on a back face the normal is pointing away from the viewpoint in that the angle between the normal and the direction towards the viewpoint is greater or equal to 90 degrees. In a solid model a back face is not a visible face. For polyhedral models wherein all faces are planar most conventional systems can distinguish between front and back faces automatically and can be instructed to display only the front faces. For a convex solid, each pixel is covered by at most one front face. Consequently, correctly shaded images of convex solids can be obtained by simply displaying the front faces.

However, and as shown in FIG. 4, for non-convex solids the projections on the display screen of several front faces can overlap, and a face being processed may be displayed on the screen even though it is partly or totally hidden by other, previously processed faces.

The simplest method to display only visible faces is to ensure that the visible faces are displayed after the faces which they occlude. For this method, the faces are ordered in such a manner that they can be displayed back to front, as shown in FIG. 4, and thus the visible faces which are closer to the viewpoint than the faces they occlude are displayed last. Such an ordering may be derived from a Binary Space Partition (BSP) tree which is viewpoint independent. However, the construction of a BSP tree is computation intensive and requires a software preprocessing step which may require splitting faces. Thus, this method is not suitable for real-time interactive modelling systems.

To avoid this BSP tree preprocessing step a depth buffer, or z-buffer, may be used to automatically select for each pixel the visible face. In the z-buffer approach each pixel is associated with a storage location within the z-buffer which contains the depth of the currently displayed point, the depth typically being represented as a distance between the viewpoint and the displayed point. For each new point that projects on a given display pixel, the depth of the projecting point is compared to the depth stored in the given pixel's memory location. If the new point is in front, that is, its depth is less than the depth stored in the pixel's memory, the new point is displayed and the pixel's memory is updated to reflect the new point's depth. Otherwise, the new point is ignored in that it lies behind an already displayed point and thus is not visible.

The process by which the depth values of points that project onto pixels is generated for a face is called scan-conversion. These depth values are typically generated in scan-line order using a constant depth increment from one pixel to the next. In the methods described below in relation to the invention, pixels that are not covered by a face are assigned a default depth which is the maximum or the minimum depth representable in the z-buffer, depending on the role played by the face.

This method is illustrated in FIGS. 5a–5d for a plurality of points designated a, b and c. In FIG. 5a the intensity for each pixel is set equal to a background intensity and the distance stored in the z-buffer is initially set equal to infinity or some large number. In FIG. 5b a point "a" is processed. The intensity is made equal to that reflected by the point "a" and the distance stored in the z-buffer of the corresponding pixel is made equal to the distance from the view point to point "a". In FIG. 5c, the point "b" is processed. In that the distance to "b" is less than the distance to "a" the point "b" is displayed and the intensity is made equal to that reflected by point "b". Furthermore, the depth of "b" is stored in the z-buffer memory. In FIG. 5d a point "c" is processed. In that the distance to point "c" along the z-axis is greater than the distance to point "b" currently stored int the z-buffer memory the point "c" is ignored and the final intensity of the point is that of point "b", which is the point visible through the corresponding pixel.

One significant problem associated with the use of a BSP tree or of a conventional z-buffer is that the faces of the solid must be known. Since faces of the solid are not explicitly represented in the CSG tree they must be derived before they can be displayed. Such a derivation is known as a "boundary evaluation" and is a complex process which involves a large number of time consuming geometric calculations. Typically, the boundary evaluation process trims the faces of the primitive volumes by computing the solid's edges. Edges are computed by first generating curves, or pairwise intersections of surfaces, and then partitioning these curves accordingly to their intersections with all other primitive volume faces. Edges of the final solid are selected from this partition using the Boolean expression captured in the CSG tree. When a curve lies on more than two primitive faces, this selection may require an expensive evaluation of "edge-neighborhoods". It should be clear that, for objects involving hundreds of primitives, a boundary evaluation process implemented on a typical general purpose computer will be too slow for interactive use. Furthermore, the changing of a single parameter, such as a dimension or a position of a single primitive volume, may necessitate the recalculation of the entire boundary representation. The time required for such computation is a serious limitation on a user's ability to readily manipulate an object, such as is often required to correct mistakes in a design.

This boundary evaluation problem can be circumvented by employing a ray-casting algorithm, illustrated in FIG. 6, which computes lines, or rays, which pass through the viewpoint and the pixels of the screen model. Next the algorithm computes the intersection of each such ray with the solid. Along each ray a first intersection point, A, being the closest to the viewpoint, is selected and the surface hit by the ray at that point is used to compute the associated pixel color. Computing the intersection of the ray with the solid may be accomplished by first classifying the ray against each primitive volume by partitioning the ray into segments that are entirely in, on, or out of the primitive volume and then by merging the results of these classifications up-the-tree according to the Boolean operators associated with the nodes of that tree. These merging operations typically involve only numerical comparisons and logical operations. However, the process of partitioning the rays with respect to primitives requires line/surface intersection calculations, which become time consuming as the surfaces become more complex; these more complex surfaces corresponding to zeros of polynomials of higher degree. As such, known software implementations of ray-casting algorithms are too slow for interactive use.

In a scanline technique for each pixel all the rays for a given row of pixels are grouped and together they correspond to a horizontal row or line of the display screen. All rays for a given row need only be intersected with primitives whose images overlap with that particular row. The scanline method keeps track of the "active" primitives for the current row, the active primitives being those whose projection overlaps with the row. Rows on the screen are processed top-down, either one by one, or in relatively small groups of consecutive rows. A primitive enters the active list when its highest point lies on the row being processed. The primitive exits the active list when its lowest point is on the previously processed row. The highest and lowest points are determined using the coordinates of the projections of their vertices on the screen. For solids bounded by planar faces the highest and lowest points can be computed relatively easily. Also, efficient incremental methods may be used to compute the intersections of successive rays with any active face. Such scanline methods have been implemented for displaying boundaries of polyhedra. However, the computation of the solids boundary and its decomposition or approximation into planar faces is too slow to be performed at interactive rates with known scanline techniques.

In order to speed up the display process, specialized hardware systems have been developed. Initially such specialized systems implemented portions of the viewing transformation and scan conversion process with dedicated hardware. To further improve the performance, systems having parallel hardware architectures and employing pixel-parallel algorithms have been constructed wherein several processors operate on different image segments in parallel. The extreme of this approach is offered by a system that provides a small processor for each pixel of the display. So-called scanline systems offer an intermediate approach by providing a row of processors for one virtual scan line. After the generation of the pixel values, the values may be written directly to the video display, which requires that the values be generated at the video refresh rate, or the values may be stored in a frame buffer.

Such specialized hardware systems are generally substantially more costly and complex than a general purpose computer. Furthermore, these specialized systems by their nature do not address the problem of providing a fast and efficient method of shading CSG solids. Also, even for these specialized systems the aforementioned deficiencies in determining the faces and boundaries of a solid and in processing a CSG solid representation detrimentally impacts the speed of the system.

To avoid the complex and expensive calculations involved in the merging step of the above mentioned ray-casting algorithm, and to fully use the hardware support for face scan-conversion and for viewing transformations when displaying CSG solids, depth-buffer algorithms have been proposed (Goldfeather et al., Jansen). Thee algorithms convert the CSG tree into a sum-of-product (disjunctive) form, where each product is the intersection of solid primitives or of their complements. In these algorithms, points on the faces of each primitive are compared, using a depth-buffer, to all other primitives in the product. Points that are not on the product are rejected after one of these comparisons. Remaining points are processed for display using a depth-buffer to select the visible points.

This approach suffers from a significant deficiency in that products are rendered by comparing the depths of points of each primitive with all other primitives in the product. Such comparisons require a multiple scan-conversion of each primitive in each product. For example, when scan-converting a primitive A of a product ABCDE, the faces of B, C, D, and E must be scan converted to trim A to its visible contribution in the product ABCDE. Then, to scan-convert B, the remaining primitives C, D, and E must be scan-converted again in order to trim B to its visible contribution. This process is repeated until all primitives in the product are processed. In this example E is scan-converted five times.

Thus, a method that avoids the repeated scanning of the primitives in a product, such as a method wherein primitives in a product need only be scanned once to render a product, is a desirable goal. Furthermore, and has been made apparent, a need exists for a system and a method for rapidly and efficiently providing realistic shading for CSG represented solids and which also readily detect differences and interferences between such solids.

SUMMARY OF THE INVENTION

The foregoing problems are overcome and other advantages are realized by, in accordance with the invention, apparatus and method for generating realistically shaded images or pictures of solids. The solids are of the type defined in CSG as Boolean combinations of simple primitive volumes. The invention readily detects interferences and differences between solids. An architecture of a system of the invention employs at least one pair of front and back depth-buffers which can be realized with pixel-parallel computer systems or efficiently simulated on scan-line computer systems used for computer graphics. The method of the invention extracts from CSG representations a particular form of Boolean expressions referred to as z-connected products. The use of z-connected product expressions in conjunction with pairs of front and back depth-buffers greatly reduces the amount of processing required to produce realistic shaded pictures of solid objects defined in CSG or to detect interferences or differences among such solids. The use of the invention significantly improves the performance of computer systems used for solid modelling and CAD/CAM applications.

More particularly, the invention is advantageously employed to produce shaded pictures of solids represented in CSG and to detect interferences and differences among two such solids. The invention utilizes a novel concept of z-connected sweeps and related concepts. These related concepts include the realization that a solid represented by any CSG tree may also be represented as a union of z-connected products and that these z-connected products may each be expressed as intersections of two z-connected sweeps. Furthermore it is shown that expressions of z-connected products in terms of sweeps can be extracted directly and efficiently from a CSG tree.

The invention teaches that a volume occupied by any z-connected product is completely represented by two depth-buffers and that the intensity of light reflected by a z-connected product is stored in an intensity buffer. A triple-buffer representation, including two depth buffers and an intensity buffer, of a z-connected product is produced by scan converting but one time each z-connected sweep defining that product. Furthermore, during scan conversion, empty products and empty intersections of products with a particular line are readily detected.

The invention further teaches that a final picture or image is readily obtained by merging a front buffer for each z-connected product to a conventional depth-buffer and that several sets of triple buffers may be employed to store intermediate products and improve the overall performance.

In accordance with one aspect of the invention several processors, each with a triple buffer, are operated in parallel to evaluate products and merge their respective results into a single z-buffer. Processes traverse the CSG tree and, without building an expanded sum-of-products tree, produce a description of each z-connected product. This description is a list of references to the front or the back primitive-faces that define each sweep. The z-buffer representation of each z-connected product is generated on the fly and requires that each primitive-face of a product be scan-converted but once.

For interference or difference detection the process terminates when a non-empty z-connected product is found.

For the generation of a shaded picture, an intensity buffer is computed together with the depth-buffer representation of each z-connected product. The intensity buffer contains the image of the solid represented by the z-connected product. The representation of each product is incrementally integrated to the representation of the final picture. During these combine operations a general depth-buffer is used to select the visible contribution of each z-connected product by storing for each pixel the depth of the front-face of the z-connected product closest to the view-point. A general intensity buffer is also employed to store the image of the visible subsets of the front-faces of z-connected products.

The method of the invention may be used for all pixels in parallel, in a manner similar to the aforementioned pixel-parallel algorithms, or for only a few rows of pixels at a time, using a scanline architecture.

Furthermore the invention provides for additional depth-buffers and intensity-buffers, grouped into triplets each of which includes a front depth-buffer, a back depth-buffer and an intensity-buffer, to process in one pass Boolean expressions that are not fully expanded into a union of z-connected products. The use of multiple buffer triplets reduces the total number of times each primitive-face is processed and even further enhances the overall efficiency and speed of the apparatus and method of the invention.

Instead of using three buffers for each product (a front depth-buffer, a back depth-buffer, and an intensity buffer), certain of the algorithms disclosed herein require only two buffers (a front depth-buffer and an intensity buffer) and a one bit mask. The back depth-buffer, which typically requires at least 24 bits of storage per pixel, can therefore be replaced with a smaller buffer of only one bit of storage per pixel. This saving is significant when depth-buffers for a full screen are used.

A scan-line architecture system which is constructed in accordance with the invention automatically rejects z-connected products without processing all of the primitive faces or half spaces. This rejection occurs when a z-connected sweep, used in the definition of a z-connected product, does not intersect a row of pixels for which the display is calculated. The rejection also occurs when the projections on a row of the faces of all the z-connected sweeps already processed in a given z-connected product do not intersect. These intersections are determined in an incremental fashion by a scan-line display algorithm.

BRIEF DESCRIPTION OF THE DRAWING

The above set forth and other features of the invention will be made more apparent in the ensuing Detailed Description of the Invention when read in conjunction with the attached Drawing, wherein:

FIG. 7a shows a non-convex solid having a first orientation to a viewpoint, the solid being z-connected;

FIG. 7b shows the non-convex solid of FIG. 7a in a second orientation, the solid not being z-connected;

FIGS. 8a-8c illustrate a z-connected set S, a front sweep Sf and a back sweep Sb of S, respectively;

FIG. 9 illustrates that a z-connected solid is the intersection of the solid's front and back sweeps;

DETAILED DESCRIPTION OF THE INVENTION

Figure 1:
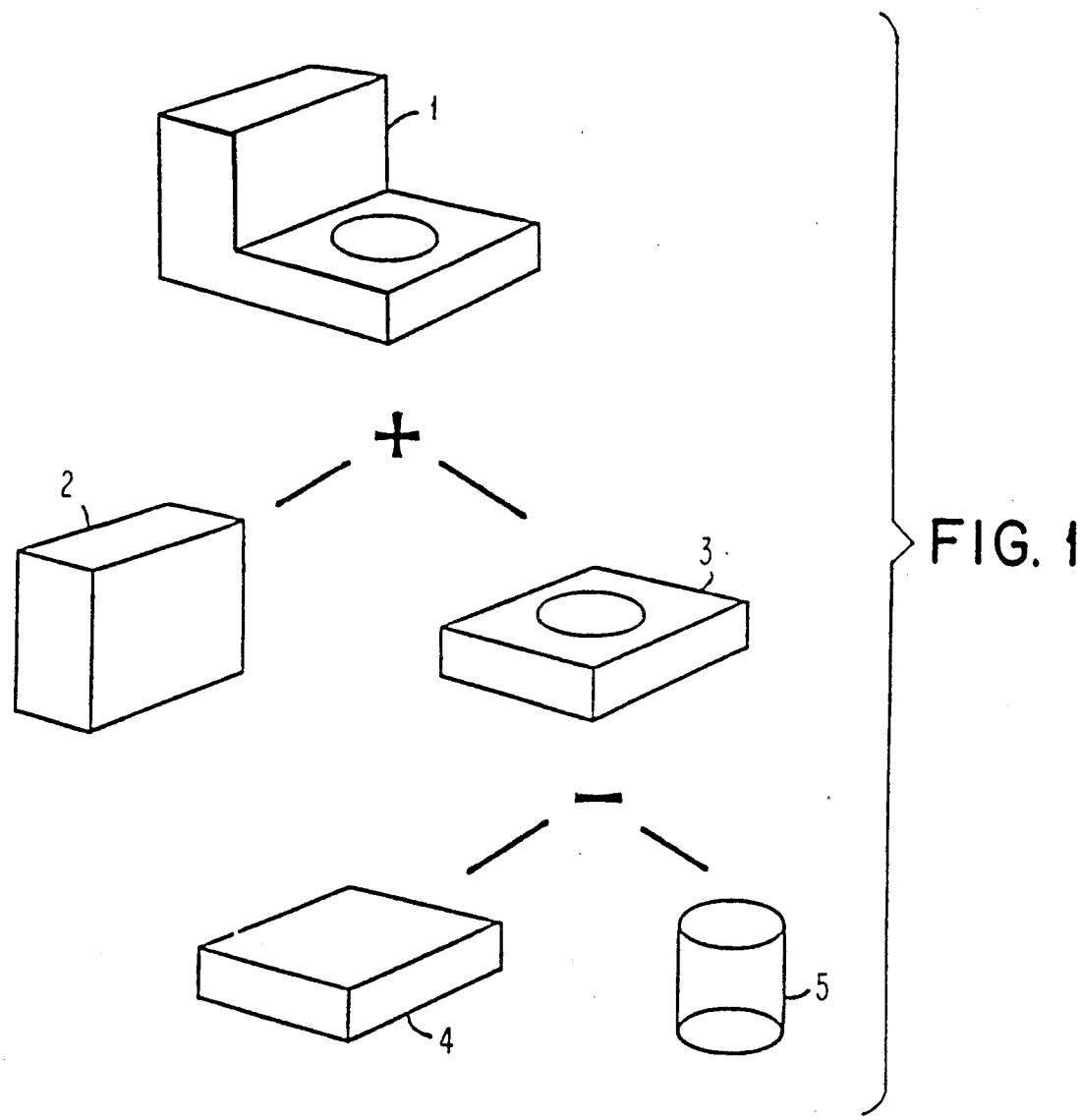
FIG. 1 an illustrative CSG binary tree representation of a solid 1.
Figure 4:
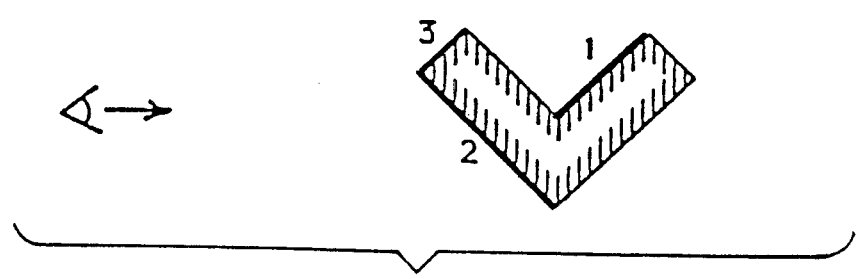
FIG. 4 illustrates a back-to-front ordering for displaying front faces of a non-convex solid.
Figure 2A:
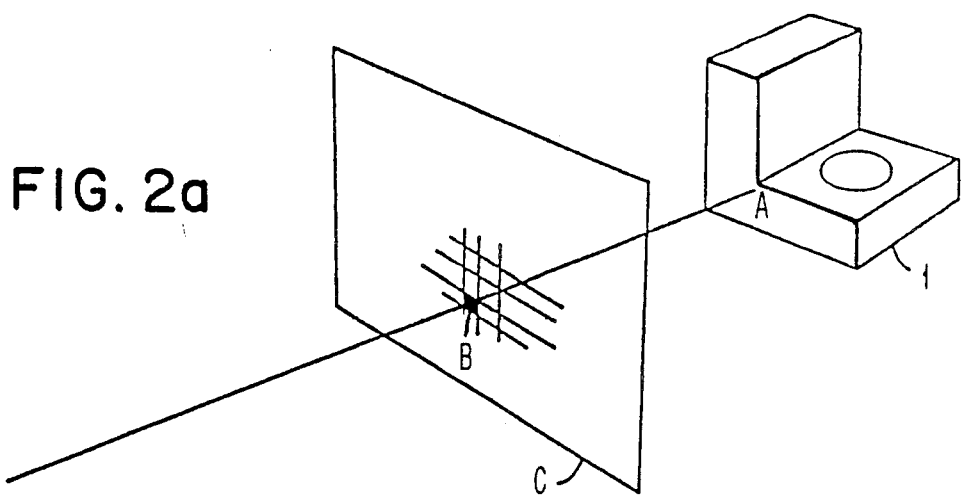
FIG. 2a shows a point A on a face of a solid 1 viewed through a pixel B of a screen model C.
Figure 2B:
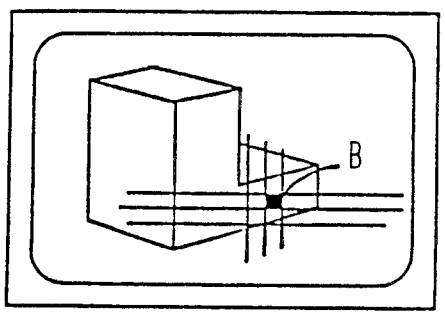
FIG. 2b shows a screen image of the point A viewed through the pixel B.
Figure 3A:
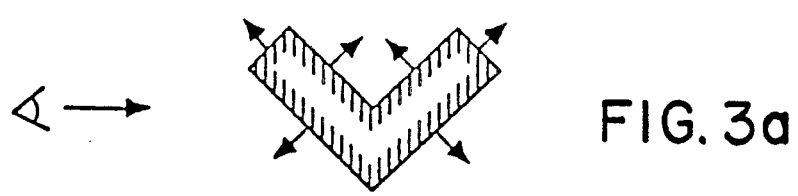
FIGS. 3a-3d illustrate that the classification of faces of a non-convex solid is a function of viewpoint.
Figures 3B, 3C, 3D:
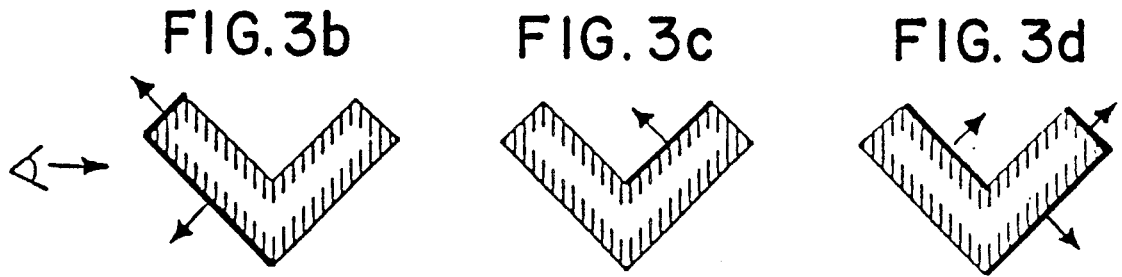
Figure 5A:
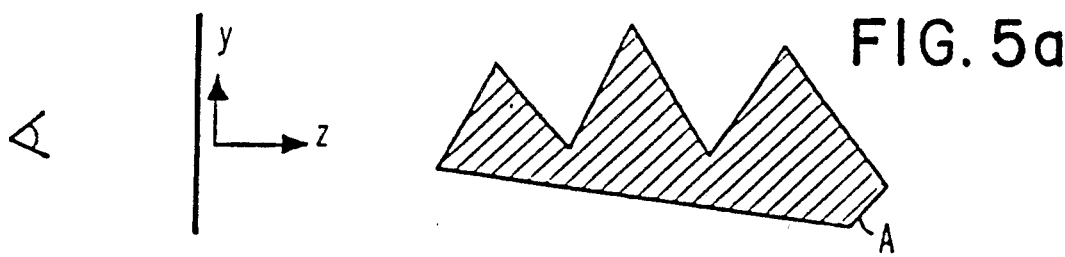
FIGS. 5a-5d illustrate a conventional depth buffer algorithm wherein for a given pixel the visible point on a solid A is selected by depth comparisons.
Figure 5B:
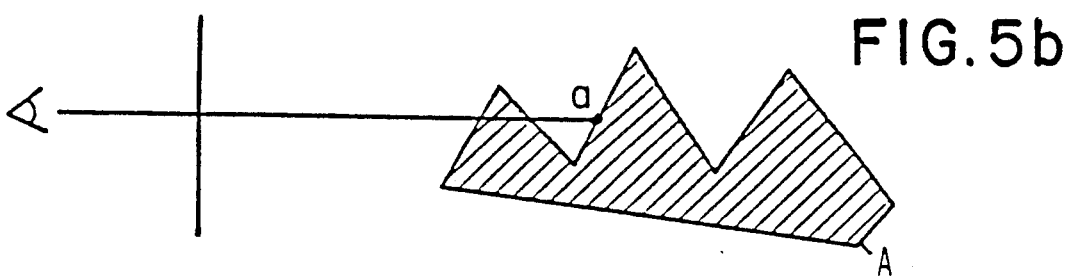
Figure 5C:
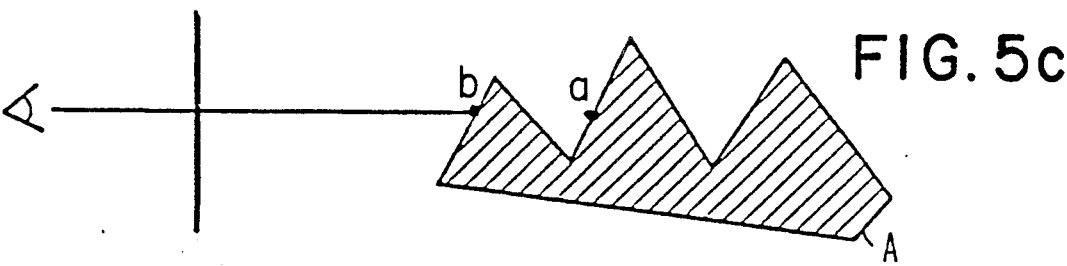
Figure 5D:
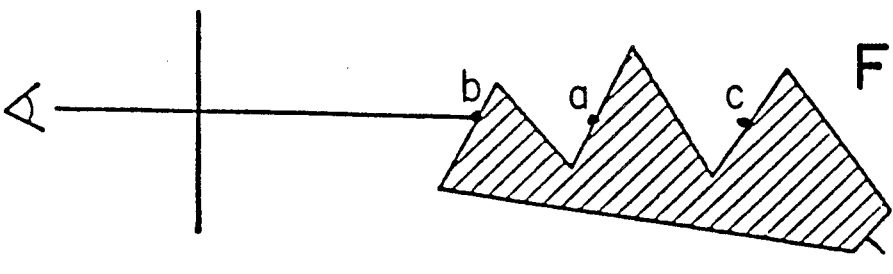
Figure 6:
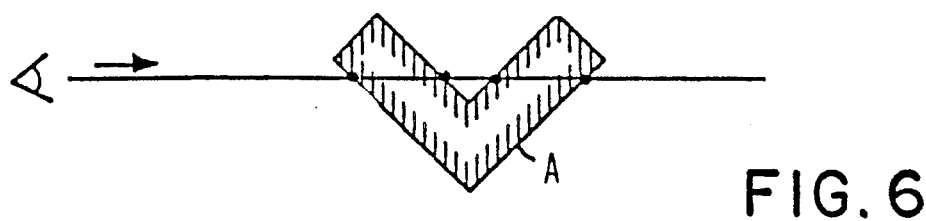
FIG. 6 illustrates a conventional ray casting algorithm which selects a visible point A.

In the following description of the invention a CSG representation is expressed in terms of a union of products, such that each product is the intersection of front or back sweeps and represents a set that exhibits a certain connectivity property. It will be shown how such a decomposition is derived from any CSG representation and methods are presented that employ such a decomposition. The use of triple depth buffers, or z-buffers, are shown to produce correctly shaded pictures or images and to also test for interference and difference directly from CSG. Furthermore the use of such a triple depth buffer in a scanline architecture will be described.

As was previously stated, if the faces of a solid are known, a shaded picture of the solid can be produced by displaying each face and by using a z-buffer to eliminate hidden faces. The order in which the faces are displayed is not important in that the z-buffer will select the visible faces automatically. Furthermore, when a z-buffer is used, an attempt to display an additional face that lies inside a solid will have no effect on the image in that every point of the additional face lies behind at least one point of some front face of the solid.

Taking advantage of this property, and in accordance with the invention, the use of a z-buffer is extended to shade solids, the solids being defined as the union of a finite number of possibly intersecting subsolids, referred to herein as products. The faces of the solid are a subset of the faces of all the products. Furthermore, any point on a product's face is either on the solid or inside of the solid.

Among all of the points that project on a given pixel only the one point which is closest to the viewpoint is displayed. The z-buffer memory of this pixel contains the depth of the closest point. This depth is the minimum one of the depths of all points that project on the pixel. It should be noted that, in fact, only points on the front faces of each product must be considered.

Consequently, if the front faces of the products are known the z-buffer produces a correctly shaded image for the entire solid. An explanation will now be provided as to how a solid represented by a CSG tree is expressed as the union of products such that the front faces of each product are determined using, in accordance with the invention, two additional z-buffers and a temporary intensity buffer.

A standard coordinate system employed for computer generated graphics is defined such that the screen model is orthogonal to the Z-axis. A solid is said to be z-connected only if its intersection with any line parallel to the z-axis is connected (empty set, single point, or connected line segment). In this regard it should be noted that convex solids are z-connected, independently of their orientation, but non-convex solids may be z-connected or not, depending on their shape and on the viewpoint. As can be seen in FIG. 7a a non-convex solid is z-connected while the same non-convex solid of FIG. 7b is not, due to the concave portion of the surface which is hidden from the viewpoint. Furthermore the common primitive volumes can always be decomposed into z-connected sets. Blocks, spheres, cylinders and half cones are convex solids and thus always z-connected. However, a torus is an example of a non-convex primitive volume that is z-connected when its axis of symmetry forms a sufficiently small angle with the Z-axis. However, when that angle exceeds a certain value the torus is no longer z-connected. It can however be decomposed into two separate z-connected volumes. Although it is possible to obtain such a decomposition without introducing any new front or back faces, it is generally much simpler to cut the torus into two equal halves that are z-connected.

Referring to FIG. 8a there is shown a z-connected set S. FIG. 8b shows that the front sweep, Sf, of the solid S is that region of space swept by S as it moves in a positive z-direction, or away from the viewpoint, starting at its initial position and going to infinity. Similarly, FIG. 8c shows that a back sweep, Sb, of S is that region of space swept by S as it moves in the negative z-direction, or towards the viewpoint, starting at its initial position and going to infinity. Sf and Sb are unbounded z-connected sets.

As can be seen in FIG. 9, if S is z-connected then S is equal to the intersection of Sf with Sb. Furthermore, it can be realized that complements of front or back sweeps are z-connected and that the intersection P of any number of front or back sweeps is z-connected. Consequently, the intersection may be represented as the intersection of only two sweeps Pf and Pb; a front sweep and a back sweep, respectively, of P. Pf is entirely represented by its front faces in that it has no back faces. Conversely, Pb is entirely represented by its back faces. Consequently, within the accuracy dictated by the resolution, or number of pixels, of the display screen Pf and Pb may each be represented by a single z-buffer Zf and Zb, respectively.

Figure 10:
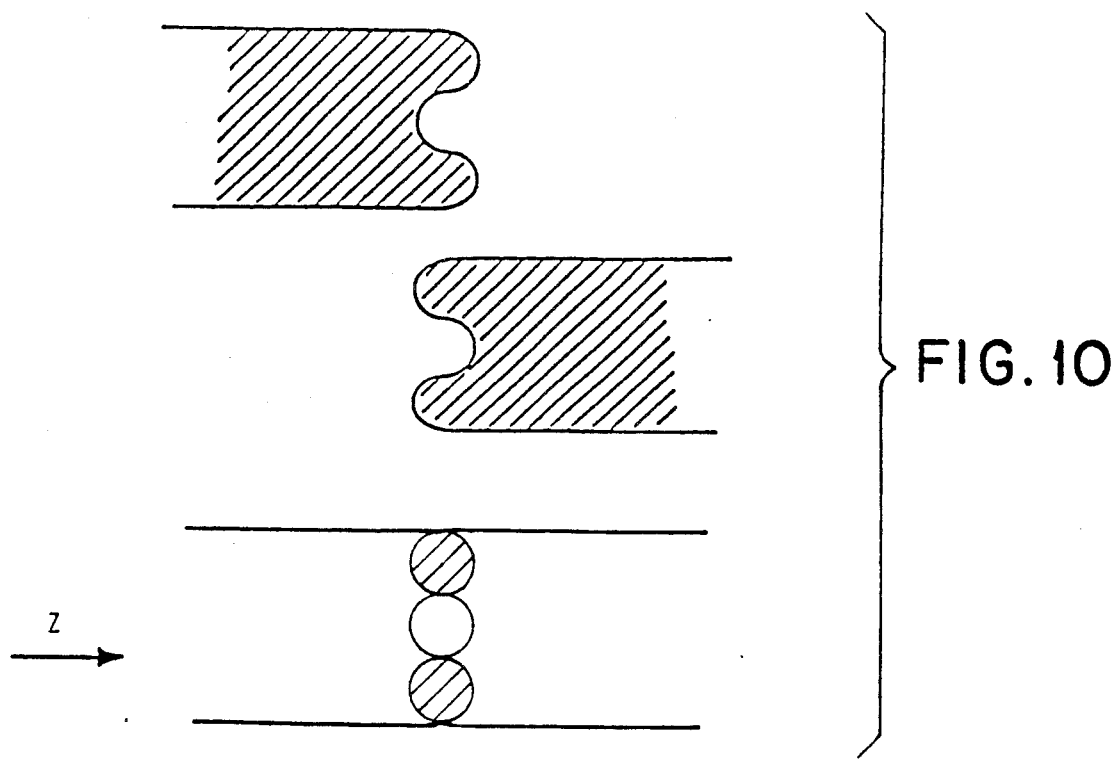
FIGS. 10 illustrates that the front faces of a z-connected product P are that portion of the front faces of a front sweep Pf which lie in front of the back faces of the back sweep Pb.

In regards to determining the product representation any CSG tree may be expressed as a union of products such that each product P is the intersection of a number of front sweeps with a number of back sweeps. In accordance with the invention the shading and the interference and difference detection processes employ the z-buffer representation of such a product which is constructed by employing the two z-buffers F and B. The contents of F are determined by storing for each pixel the minimum depth of all points of the front faces of the sweeps defining Pf that project on that pixel. The contents of B are determined by storing for each pixel the maximum depth of all points of the back faces of the sweeps defining Pb that project on that pixel. Thus, in order to calculate F it is only necessary to traverse the faces of the front sweeps of P. Furthermore, each front face need only be traversed once. Similarly, to compute B it is only necessary to traverse but once the faces of the back sweeps. F and B, determined as indicated above, represent the intersection of all front and back sweeps, respectively, which define P. However, P has been previously shown to be the intersection of Pb with Pf. Thus, the front faces of P are contained in, but need not be equal to, the front faces stored in F as shown in FIG. 10. In point of fact the front faces of P are equal to that portion of the front faces stored in F that lie in front of the back faces stored in B. Consequently, the extent of the front faces of P are determined by comparing, for each pixel, the depth stored in F with the depth stored in B.

Figure 11A:
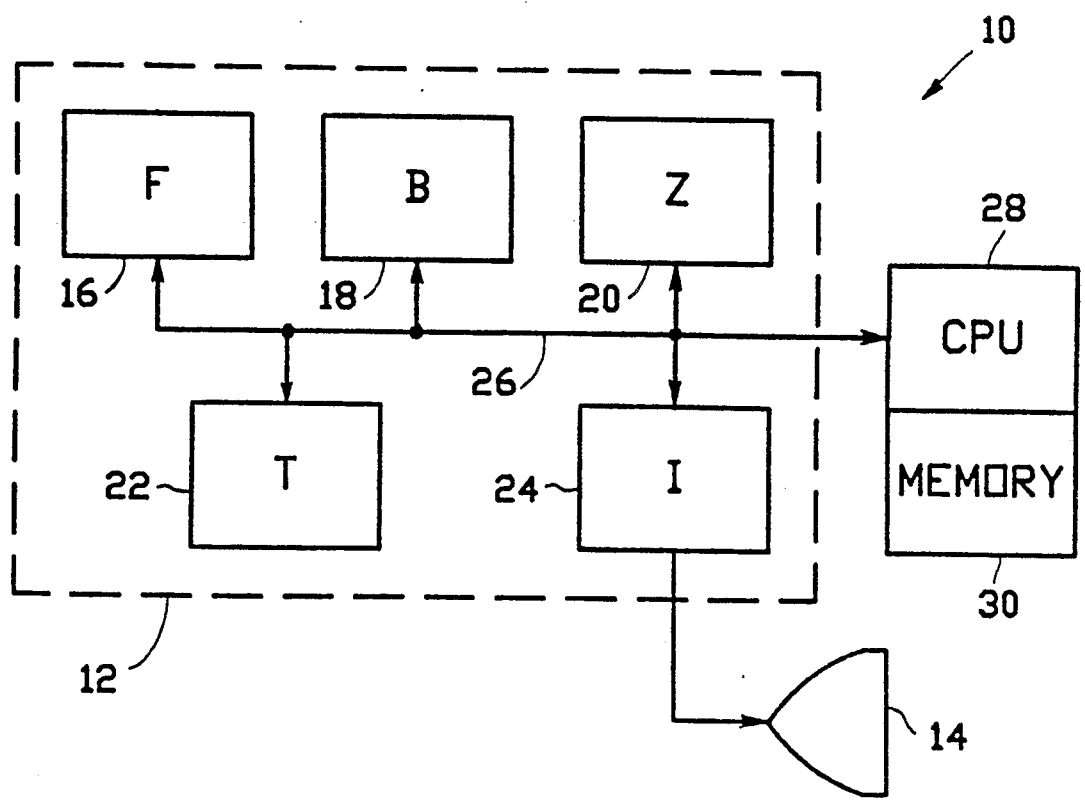
Figs. 11a and 11b are each a block diagram of a solid modelling system 10 constructed in accordance with the invention to have a plurality of z-buffers and intensity buffers.

In accordance with one embodiment of the invention and as illustrated in FIG. 11a the above set forth teaching is implemented in a solid modelling system 10 having a triple z-buffer architecture. A pixel memory 12 may be a full frame buffer for an entire display screen 14 or a line buffer for a scan-line type system. In either case, for each pixel stored in the pixel memory 12 there are five storage entries grouped into five buffers. One of these buffers is a temporary front z-buffer (F) 16 which is employed to store the depths of the front face for the currently processed z-connected product. Another of these buffers is a temporary back z-buffer (B) 18 which stores the depths of the back face for the currently processed z-connected product. Another buffer is a final z-buffer (Z) 20 which is used to store the depths associated with the front faces of the entire displayed solid. Two other buffers are a temporary intensity buffer (T) 22 for storing the intensities of the current product and a final intensity buffer (I) 24 for storing the intensities of the visible faces of the entire displayed solid.

In the illustrated embodiment a bus 26 couples these various buffers together and to a processor 28 which may be a central processing unit or a peripheral processor dedicated to managing the buffers and for executing instructions for accomplishing the method of the invention. In this regard the processor 28 has an associated memory 30 for storage of the CSG tree structure which defines a displayed solid in addition to storing other data and instructions required for managing the buffers and display, operator interaction and other processor 28 functions. It should be realized that the pixel memory 12 may be organized in a number of manners and may include, for example, 24 planes of single bit storage locations for defining a 24 bit pixel word associated with each of the z-buffers and intensity buffers.

In accordance with the methods of the invention the processor 28 traverses the original CSG tree and processes each z-connected product separately. For a given product, the contents of the F 16, B 18 and T 22 buffers are determined by incorporating the contribution of each sweep to the z-connected product. After all front and back sweeps of the product are processed, the result is incorporated into the final Z 20 and I 24 buffers. An algorithm descriptive of this method for a scanline architecture system is described below, it being realized that the algorithm is repeated for each row of pixels.

In this high-level algorithm the symbol "LT" stands for less than.

```
Z = backplane.depth;
I = background.color;
FOREACH p IN products DO
  BEGIN
  F = backplane.depth;
  B = frontplane.depth;
  T = background.color;
  left = 0;
  right = 0;
  FOREACH h IN p.facesOfProductSweeps DO
    BEGIN
    hl = h.startpixel;
    hr = h.lastpixel;
    IF isPositive(h) THEN
      BEGIN
      left = MAX(left,hl);
      right = MIN(right,hr);
      END
  FOREACH x IN pixelsOfThatRow DO
  IF (NOT isPositive(h) AND (x IN interval(lr,hr))) OR
     (isPositive(h) AND (x IN interval(left,right))) DO
    BEGIN
    d = h.depth(x);
    IF h.isafrontface THEN
      BEGIN
      IF d GT F(x) THEN
        BEGIN
```

```
          F(x)=d;
          T(x)=h.intensity(x);
        END;
      END
    ELSE IF d LT B(x) THEN B(x)=d;
    END;
  END;
  FOREACH x IN pixels DO
    IF x IN interval(left,right) THEN
      IF F(x) LT MAX(B(x),Z(x))
        THEN BEGIN Z(x)=F(x); I(x)=T(x); END;
END;
```

Figure 12:
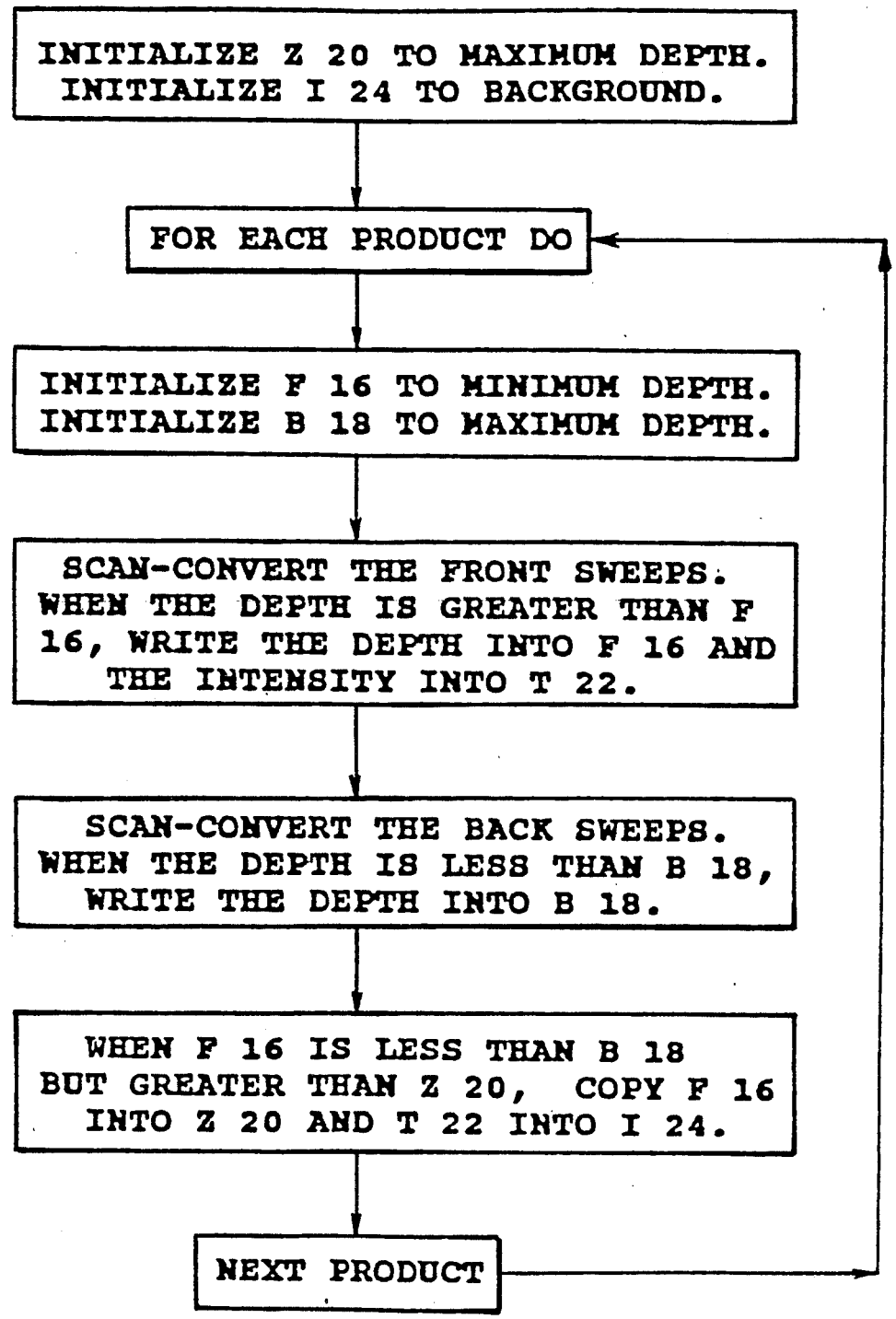
FIG. 12 is a flow chart which illustrates a method of the invention of processing z-connected products of a CSG tree.

FIG. 12 is a flow chart of the operation of the above set forth algorithm, in the case where full frame buffers and Z-buffers are used as opposed to the scan line approach.

In accordance with another aspect of the invention there is provided apparatus and method for performing interference or difference detection to, for example, determine if two solids A and B interfere or if they are identical. A modified version of the display algorithm set forth above is applied to the CSG representation of A B or of (A-B) union (B-A). This determination does not require a final Z-buffer 20 nor any intensity buffers 22 and 24 in that it evaluates each product until a non-empty product is detected. Once the front and back z-buffers for a product have been determined, in accordance with the above set forth algorithm, the following test is performed instead of the last FOREACH loop shown above.

```
FOREACH x IN (left,right) DO
    IF F(x) LT(B(x)) THEN RETURN(not_empty);
END;
```

If (not_empty) is returned it is indicated that an interference exists or that two solids are not equal.

There is now described a series of transformations that, given any CSG tree, produce a CSG tree that is a union of z-connected products, where each product is the intersection of front or back sweeps. The front or back sweeps are readily determined from the nature and position of the primitive volumes of the original CSG tree.

Figures 11B, 13:
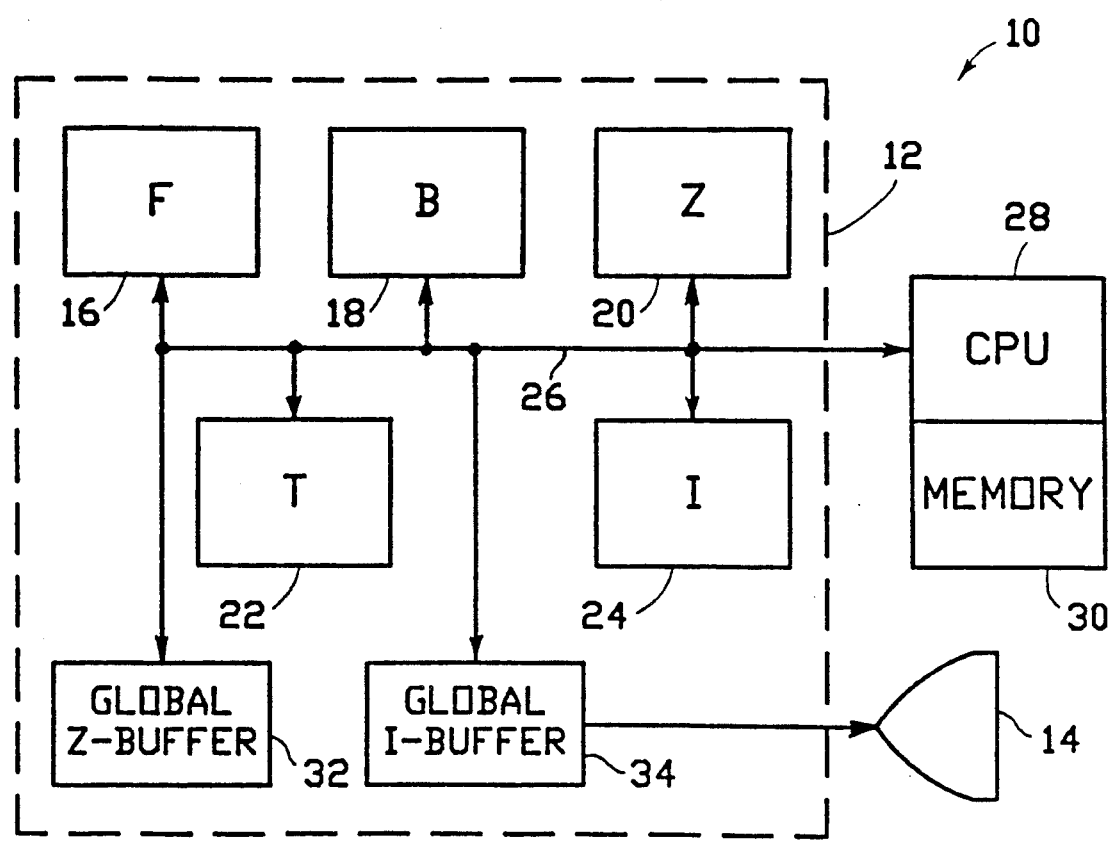
FIG. 13 is a flow chart which illustrates a method transforming a CSG tree to produce a CSG tree that is a union of z-connected products.

As seen in the flowchart of FIG. 13 the following sequence of transformations constructs such a CSG tree.

At block A each primitive volume, or half space, that is not z-connected is replaced by a union of z-connected subvolumes. At block B each primitive volume, or half-space, is replaced by the intersection of its front sweep with its back sweep. At block C, each difference operator in the tree is replaced by an intersection operator and the right subtree of that operator is complemented. The step of complementing the right subtree transforms the subtree into an equivalent subtree by applying de Morgan's laws of complementation. Complemented front sweeps are called backsweeps and vice versa.

The result of these steps is a CSG tree whose leaves are z-connected sweeps and whose internal nodes correspond to union or intersection nodes. This tree corresponds to a Boolean expression representing the original solid. Distributing the intersection over the union in this expression yields another equivalent expression which is in disjunctive form, that is, the union of intersections, also called sum-of-products. This resulting equivalent expression is also amenable to storage as a CSG tree.

Building an expanded tree is unnecessary and, in fact, is preferably avoided in that an expanded tree is typically much larger than the original tree. The invention provides for, instead of building a new tree, utilizing the original CSG tree to produce the list of the front and back sweeps which constitute the elements of each product thereby providing a significant saving in the amount of storage necessary for the process.

The successive terms of the disjunctive normal form are generated "on the fly" by repeatedly traversing the original tree. The method performs a preorder tree traversal propagating the sign of each node through recursive calls. At each internal node, there is determined the nature of the equivalent operator, i.e., the operator of the corresponding node in the positive form. To obtain the literals of a given product, the method traverses the original CSG tree in a top down manner. When the equivalent operator is an intersection, both the left and the right children are visited recursively. When the equivalent operator is a union, only one child is visited, which one depending on which product is computed. When a leaf is reached, the corresponding literal, or primitive of the original tree and its sign, is processed by display algorithms. To determine which path to take at each union node, a direction flag is initialized to point to the left child. When all the combinations of the products for that left child have been produced, the flag is changed to point to the right child. When all the combinations of products for that right child have been produced, the flag is changed to point to the left child again. This process is repeated until all of the products have been generated.

In a multi-processor embodiment of the invention each processor is associated with a triple buffer. The expressions defining z-connected products are dispatched to the different processors, which construct, in parallel, the triple buffer representations of their product. When a particular processor completes the evaluation of a z-connected product, it merges the result into a common z-buffer, and is ready to process the next product.

The total number of times that a face of a primitive volume A must be scan converted is a function of the number of z-connected products containing A, i.e. on the form of the expanded CSG tree. As will be shown below the teaching of the invention further improves the performance of processing CSG trees by avoiding the generation of all products for certain subtrees. That is, the invention provides techniques for processing certain CSG trees that are not in the sum-of-products form with a consequent reduction in the number of scan-conversions required for each primitive. More particularly, there is defined a class of sub-trees which are processed without scan-converting any primitive face more than once. As will be described in detail below, these processes include a process using three z-buffers and two intensity buffers and another process using four z-buffers and three intensity buffers. There will also be shown the general form of the CSG expressions that are amenable to being processed without repetitive scanning. Furthermore, the availability of additional buffers is advantageously employed to further reduce the number of times each primitive is scan-converted, and in particular permits the processing of a larger class of subtrees without scan-converting any primitive face in a product more than once.

It is pointed out that scan-converting is a known process which, based on the defined screen coordinates of a polygon, successively scans the polygon to generate a list of points covering pixels upon which the polygon projects. The list of pixels includes the x-y position of each pixel in addition to a depth along the z-axis of a point on the polygon referenced to the pixel. In conventional systems this depth is stored in the single depth or z-buffer location associated with each pixel upon which the polygon projects.

For pixels not covered by the face, the depth used is the maximum depth value when the scanned face is a front face of a positive primitive or a back face of a negative primitive. Otherwise, the minimum depth value is used.

It has already been shown that a z-connected product can be represented by two z-buffers. It will now further be shown that the complement of a z-connected product is also representable by two z-buffers and that the front face of a product of sets that are either z-connected front and back sweeps or complements of z-connected sets is determinable with only two z-buffers and one temporary intensity buffer, requiring that uncomplemented sweeps be scan-converted only once. It will also further be shown that the front face of the difference of two z-connected products, when the first product has only one front sweep, is determinable by using only two z-buffers and a temporary intensity buffer, and requires scan-converting each sweep only once. It will further be shown that the front face of the difference of two z-connected products is determinable by using three z-buffers and a temporary intensity buffer and requires scan-converting each sweep only once. It will also be shown that solids defined in CSG as a union of differences of two products, where except for the first difference, the first product of each difference has only one front sweep, are determinable by employing three z-buffers and two intensity buffers and requires scan-converting each sweep only once. Finally, it will be shown that solids defined in CSG as a union of differences of two products are determinable with only four z-buffers and two intensity buffers and requires scan-converting each sweep only once.

A representation of a solid, mathematically defined as an r-set, inherently defines its complement. Thus, in that a z-connected set is represented by its front and its back sweeps the complement of the solid is also represented by the same two sweeps, provided that it is known when the two sweeps represent the bounded solid or its complement.

In regard to the product of primitives and of complements of primitives let P denote a product of z-connected front and back sweeps. Let Q1, Q2, . . . , Qk denote k complemented z-connected sets; for example, the complements of k primitives volumes. Let S be the product of P with Q1, Q2, . . . , Qk. Each Qi, for i between 1 and k, is the union of two z-connected sweeps; it being realized that a primitive volume is typically the intersection of z-connected sweeps and thus its complement is the union of the complements of these sweeps, which are also z-connected. Consequently, expanding S into a sum-of-products of z-connected sweeps yields $2^k$ products, assuming that each Qi is the union of two z-connected sweeps. Each product is the intersection of P with k z-connected sweeps, each one from a different Qi. Processing S by generating all of its products would require that each sweep defining P be scan-converted $2^k$ times and that each complemented sweep of Q1 be scan-converted k times. However, the method described below avoids multiple scanning of the sweeps defining P in each subtree that has the general form of S. It should be noted that the process still scan-converts each Q1 k times.

Figure 14:
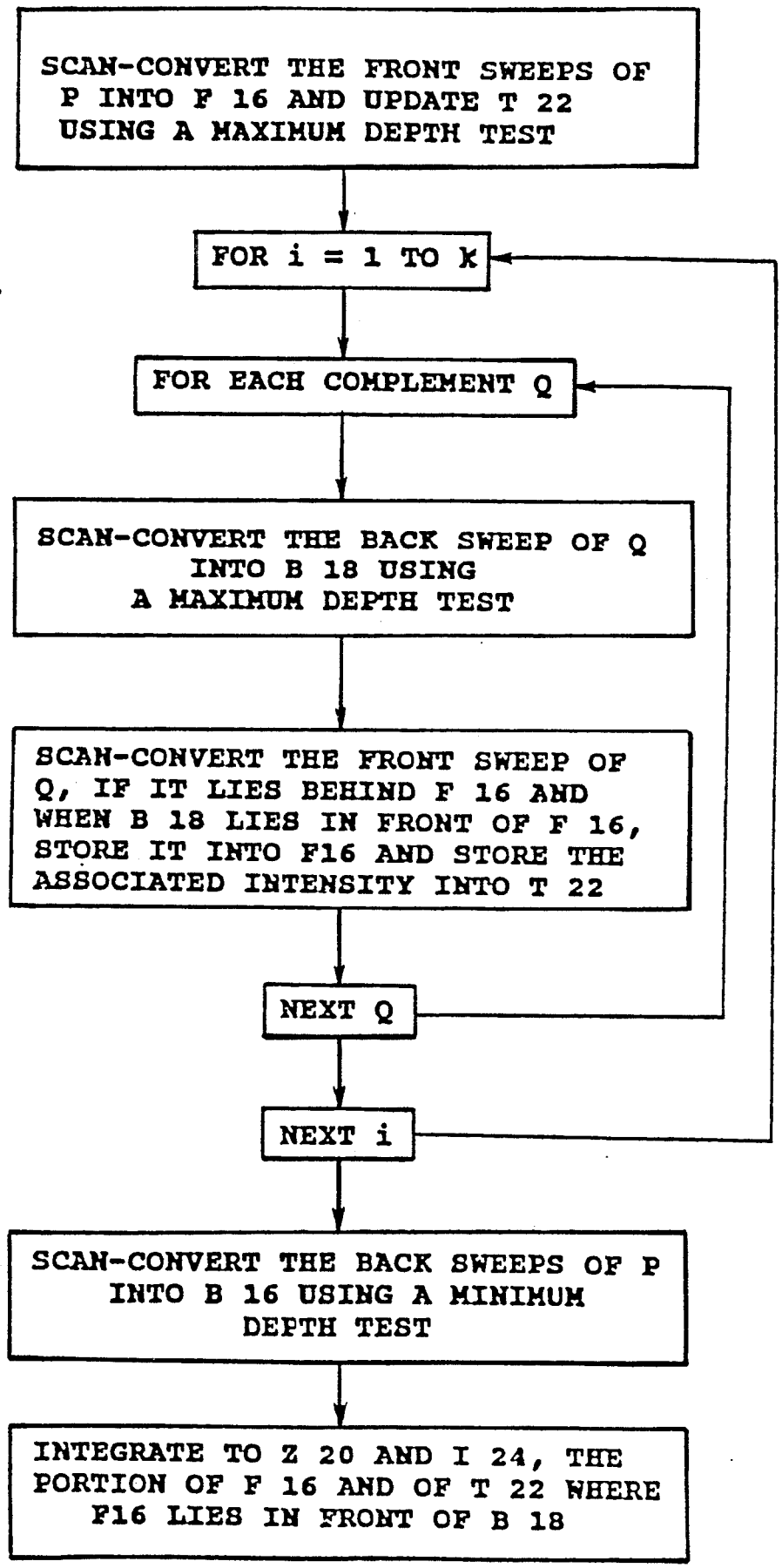
FIG. 14 is a flow chart which illustrates a method of processing products of positive and negative (complemented) primitives.

In accordance with this aspect of the invention the following sequence, illustrated also in the flow chart of FIG. 14, is performed for each subtree that is expressible as the intersection of leaves that are z-connected sets or complements of z-connected sets. In particular, such subtrees occur if one simplifies the process described above for extracting z-connected products from CSG. Specifically, primitives volumes are treated as literals and need not be considered as intersections of their front and back sweeps in the expansion process. The result is a sum-of-products where each product is the intersection of positive or negative primitives, and needs not be z-connected. Each one such product can be written as P*Q1*Q2* . . . *Qk. Each such product is processed in accordance with the block diagram of FIG. 11a and the flow chart of FIG. 14 by the following method.

First, scan-convert the front sweeps of P into F 16 using a maximum depth test to retain points that are the furthest from the viewpoint and replace the corresponding intensities stored in T 22. Next repeat the following process k times: for each complement Qi scan-convert the back sweep of Qi into B 18 and scan-convert the front sweep of Qi, storing the result into F 16 when the result lies behind F 16 and when B 18 lies in front of F 16. The intensity in T 22 is also updated in this case. Next the back sweeps of P are rendered into B 18 using a minimum depth test. Finally, that portion of F 16 which lies in front of B 18 is integrated into Z 20 and I 24. It should be noted that the back sweeps of complemented primitives correspond to the front sweeps of the original primitive and vice versa.

Figure 15:
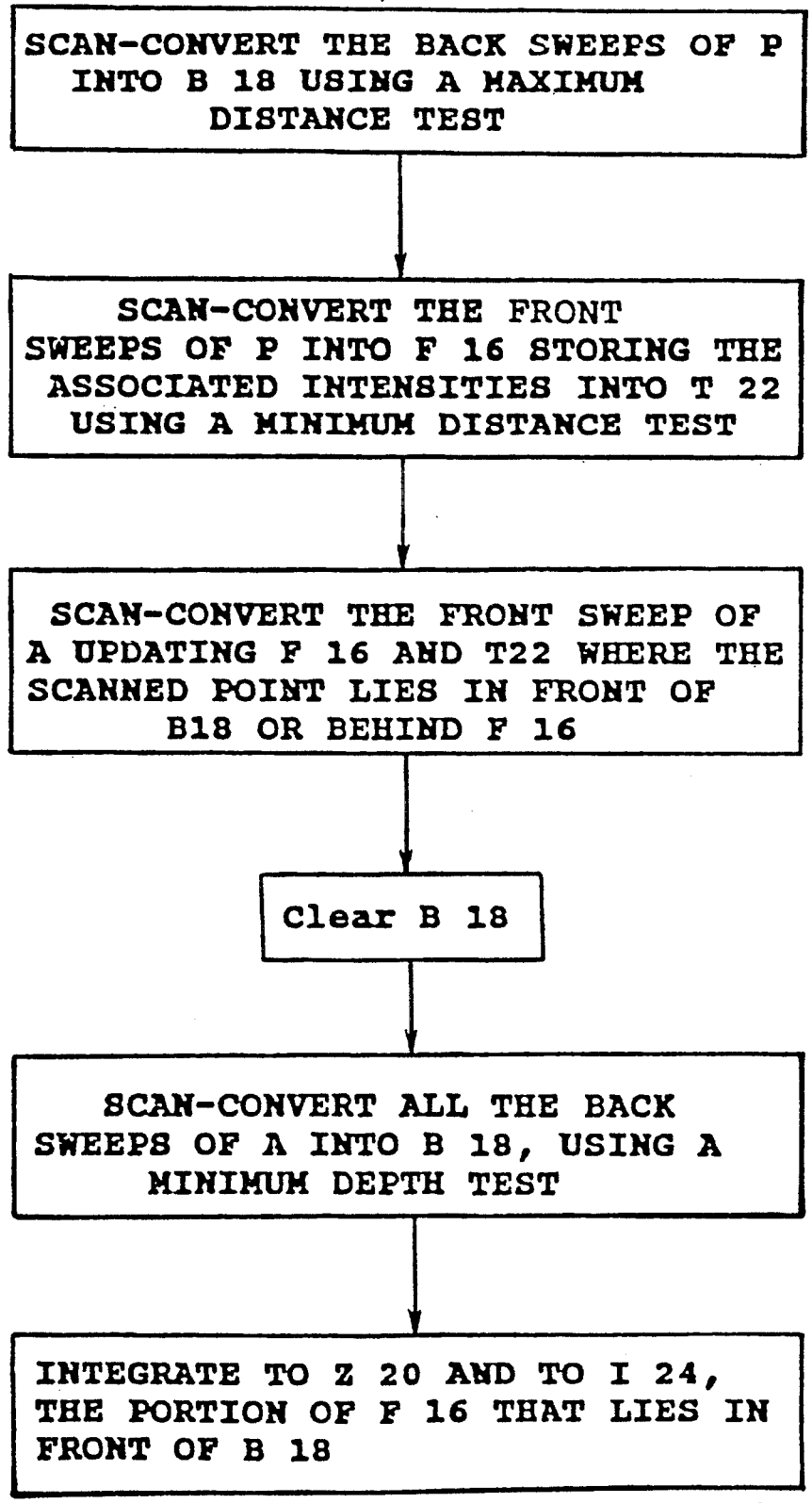
FIG. 15 is a flow chart which illustrates a method of processing a primitive A minus product P.

In regard to a primitive minus product using two z-buffers let P denote a product of front and back sweeps. Let A denote a primitive, or more generally the intersection of a single front sweep with a finite set of back sweeps. The difference A-P is determined, scan-converting each face only once, using only the two z-buffers F 16 and B 18 and the temporary intensity buffer T 22, by the following steps which are also illustrated in the flow chart of FIG. 15.

First scan-convert the back sweeps of P into B 1B using the depth buffer test to always store the maximum distance points. Next scan-convert the front sweeps of P into F 16 using the depth buffer test to always store the minimum distance points while also storing in T 22 the intensity associated with the front-most points. Next, scan-convert only the front sweep of A, and for each point that lies in front of B 18 or behind F 16, store the depth of each point into F 16 and store into T 22 the associated intensity. Next, clear B 18 and scan-convert all back sweeps of A into B 18, determining their intersection using a minimum depth test as described previously. Finally, integrate to Z 20 and I 24 that portion of F 16 which lies in front of B 18.

Figure 16:
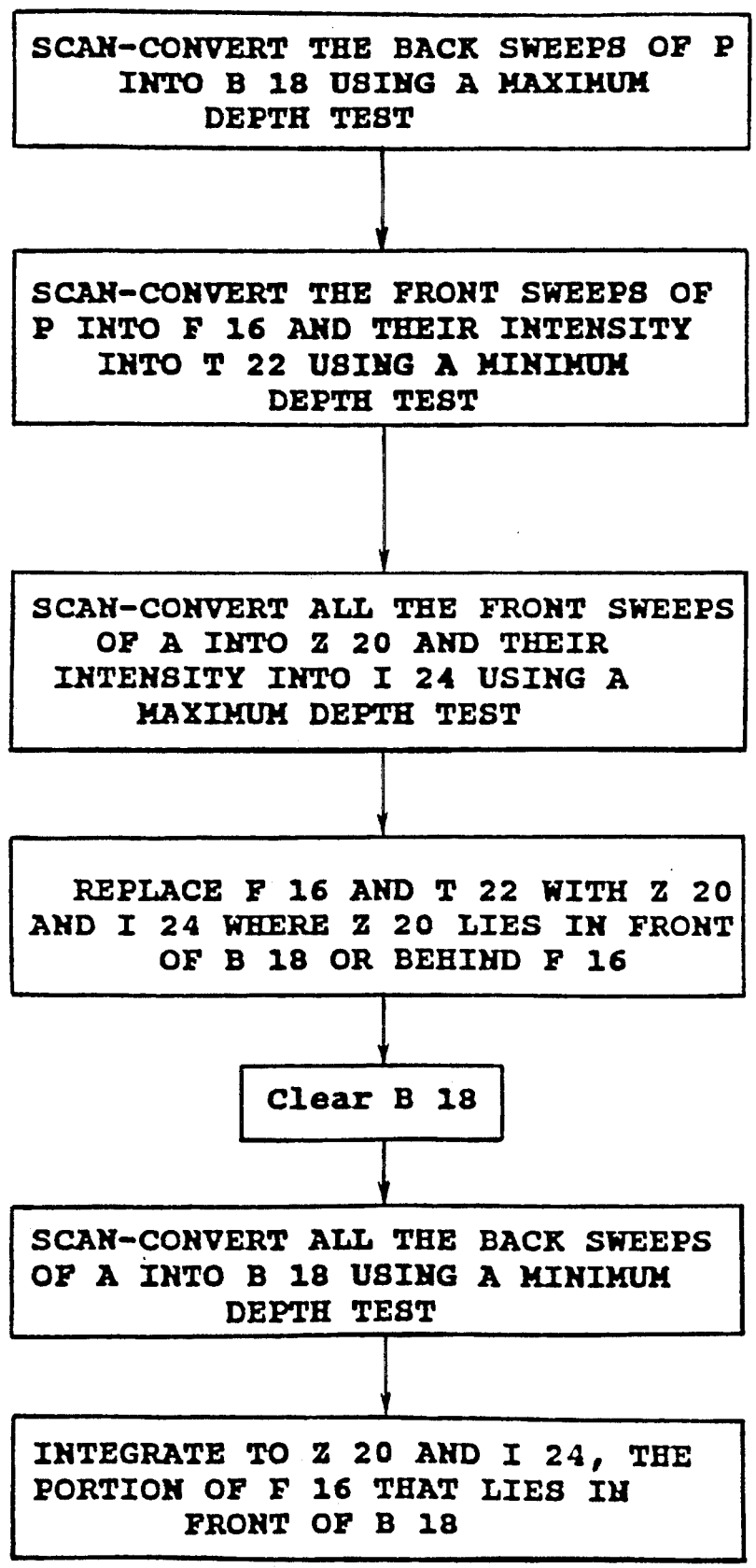
FIG. 16 is a flow chart which illustrates a method of processing a product A minus product P using three z-buffers.

In regard to the product-minus-product using three z-buffers, let A and P denote products of front and back sweeps. The difference A-P is determined, scan converting each face only once, using the three z-buffers F 16, B 18 and Z 20 and the two intensity buffers T 22 and I 24 by the following steps which are also illustrated in the flow chart of FIG. 16.

First scan-convert the back sweeps of P into B 18 using the depth buffer test to store the maximum distance points. Next, scan-convert the front sweeps of P into F 6 to obtain their union by using the depth buffer test to store the minimum distance points while storing in T 2 the intensity associated with the front-most points. Next scan-convert all front sweeps of A into Z 20, determining their intersection using a maximum depth buffer test and storing the intensity of the front-most points in I 24. Next, for each point defined by Z 20 and I 24, if the point lies in front of B 18 or behind F 16, store the depth of the point into F 16 and store in T 22 the associated intensity. Next, clear B 18 and scan-convert all back sweeps of A into B 18, determining their intersection using a minimum depth test as described previously. Finally, integrate to Z 20 and I 24 that portion of F 16 that lies in front of B 18.

The above methods are applicable to processing solids that are expressed in CSG as a union of subtrees, where each subtree is the differences of two products. In such configurations, and in accordance with the invention, each face is scan-converted only once. Solids defined in CSG as a union of differences of two products, where except for the first difference, the first product of each difference has only one front sweep, are determined using only three z-buffers and two intensity buffers because, as shown above, the first difference is determined using all five buffers while subsequent differences require only two z-buffers and one intensity buffer. However, if four z-buffers and three intensity buffers are available to the system 10, as is shown in FIG. 11b, solids defined in CSG as a union of differences of two z-connected products are processed, for display or null object detection, by scan-converting each face of each primitive volume only once, as described above. Each difference of products is processed using three z-buffers and two intensity buffers as described above, and the results are thereafter integrated into the fourth global z-buffer 32 and a third global intensity buffer 34.

It should be realized that the invention as set forth above may be practiced in a number of physical embodiments including, but not limited to, graphics processing systems of the parallel or scan-line type having dedicated buffers implemented in hardware. The invention may also be practiced with a general purpose computer wherein the various z-buffers and intensity buffers are allocated regions of memory. It should also be realized that certain methods of the invention as set forth above may be practiced using a modified embodiment wherein the back buffer B is not necessary or is replaced with a smaller buffer having only one bit of storage per pixel. For example, the front faces of a product of front and back sweeps can be computed using only the front buffer F 16 and the intensity buffer T 22 and not using the back buffer B 18 at all by the following method, which is a variation of the method depicted in FIG. 12. For each product, first scan convert all the front sweeps as in FIG. 12. Then, instead of scan converting all the back sweeps into B 18 and then using B 18 to trim down what portion of F 16 should be merged into Z 20, the back sweeps are used one at a time to trim F 16 directly. When scan-converting a back face, F 16 is replaced by the maximum representable depth at pixels where the depth stored in F 16 exceeds the depth generated by the scan-conversion, taking into account that the minimum depth value is used for pixels not covered by the face.

It should also be realized that the order in which certain operations are performed is not important and that other methods may be derived to perform the same function by permuting the order of the operations. As such the invention is not to be considered to be limited to any specific embodiment of hardware and/or software. Thus, in that modifications to the teachings of the invention may be derived by those having skill in the art the invention is intended to be limited only as the invention is set forth in the claims which follow.

Having thus described our invention, what we claim as new, and desire to secure by Letters Patent is:

1. Apparatus for displaying a solid represented by a Constructive Solid Geometry (CSG) tree structure, the solid (S) having, relative to a viewpoint, front and back faces disposed along a z-axis which is substantially parallel to a line-of-sight from the viewpoint, comprising:
   means for determining from the CSG tree structure at least one z-connected product associated with S;
   first z-buffer means (F) for storing a depth representation of a front face associated with the determined z-connected product; and
   second z-buffer means (B) for storing a depth representation of a back face associated with the determined z-connected product.

2. Apparatus as set forth in claim 1 and further comprising:
   first intensity buffer (T) means for storing a representation of an intensity of illumination reflecting from the front face associated with the determined z-connected product.

3. Apparatus as set forth in claim 2 and further comprising:
   third z-buffer means (Z) for storing a depth representation of a front face of S;
   second intensity buffer (I) means for storing a representation of an intensity of illumination reflecting from the front face of S; and
   means coupled to the first and the second z-buffer means for comparing the stored depth representation of F with the stored depth representation of B.

4. In a data processing system having a display means for displaying a representation of a three dimensional object, a method of processing a Constructive Solid Geometry (CSG) tree representation of the object to produce a list of z-connected sweeps grouped into products of z-connected sweeps, comprising the steps of:
   (a) initializing a first z-buffer means (Z) to a maximum depth and a first intensity buffer means (I) to a predetermined intensity;
   for each product,
   (b) initializing a second z-buffer means (F) to a predetermined minimum depth and a third z-buffer means (B) to a predetermined maximum depth;
   for each primitive of the product,
   (c) scan-converting front sweeps of the primitive to determine depths associated with points on the front sweeps;
   (d) comparing the depths of the front sweeps to corresponding depths in F and, for any depth which is greater than the corresponding depth in F, storing the depth in F and a corresponding intensity into a second intensity buffer means (T);
   (e) scan-converting back sweeps of the primitive to determine depths associated with points on the back sweeps;
   (f) comparing the depths of the back sweeps to corresponding depths in B and, for any depth which is less than the corresponding depth in B, storing the depth in B; and
   after performing steps c through f for each primitive;

(g) comparing the depths stored in F to the depths stored in both Z and B;

when a depth stored in F is less than a corresponding depth stored in B and greater than a corresponding depth stored in Z, (h) storing the depth of F into the corresponding location in Z and storing the associated intensity stored in T into the corresponding location in I.

5. In a data processing system having a display means for displaying a representation of a three dimensional object, a method of processing a Constructive Solid Geometry (CSG) tree representation of the object to produce a list of positive and negative, that is complemented primitives grouped into products of a disjunctive form, where each product is the intersection of a positive product P with a number of negative primitives Qi, comprising the steps of:

(a) scan converting front sweeps of a product (P) of z-connected front sweeps into a first z-buffer means (F);

(b) storing in a first intensity buffer means (T) intensities associated with a front face of P;

(c) repetitively executing steps (d), (e), (f) and (g) for k times, where k denotes a quantity of complemented z-connected sets Q1 to Qk, for each Qi (d) scan converting a back sweep of Qi into a second z-buffer means (B);

(e) scan converting a front sweep of Qi;

(f) storing into the first z-buffer means (F) the result of the step of scan converting the front sweep of Qi only when the result is determined to lie behind the corresponding content of the first z-buffer means (F) and when the corresponding content of the second z-buffer means (B) is determined to lie in front of the corresponding content of the first z-buffer means (F);

(g) storing within a second intensity buffer means (I) intensities associated with the front sweep of Qi only when the result of step (f) is stored in the first z-buffer means (F);

(h) scan converting back sweeps of P into the second z-buffer means (B); and (i) integrating to a third z-buffer means (Z) and the second intensity buffer means (I) that portion of of the contents of the first z-buffer means (F) which lies in front of the contents of the second z-buffer means (B).

6. In a data processing system having a display means for displaying a representation of a three dimensional object, a method of processing a Constructive Solid Geometry (CSG) tree representation of the object to determine a primitive (A) minus a product (P) of z-connected front and back sweeps, wherein A represents an intersection of a single front sweep with a finite set of back sweeps, the method comprising the steps of:

scan converting the back sweeps of P into a first z-buffer means B by storing maximum distance points of the back sweeps relative to a reference point;

scan converting the front sweeps of P into a second z-buffer F means by storing minimum distance points of the front sweeps from the reference point;

storing in a first intensity buffer means T an intensity associated with all stored minimum distance points;

scan converting a front sweep of A;

for each point of the front sweep of A having a distance from the reference plane that lies in front of a corresponding point stored in the first z-buffer means B or behind a corresponding point stored in the second z-buffer means F, storing the distance of the point into the second z-buffer means F;

storing into the first intensity buffer means T an intensity associated with the point;

scan converting all back sweeps of A into the first z-buffer means B; and integrating to a third z-buffer means Z that portion of the second z-buffer means F which lies in front of the first z-buffer means Z and integrating to a second intensity buffer means I corresponding portions of the first intensity buffer means T.

7. A method as set forth in claim 6 wherein the step of scan converting all back sweeps of A includes an initial step of clearing the first z-buffer means B.

8. In a system for processing a solid object comprised of one or more subsolids related by a Constructive Solid Geometry (CSG) tree structure, the solid (S) having, relative to a viewpoint, front and back faces disposed along a z-axis which is substantially parallel to a line-of-sight from the viewpoint, the system including a display means comprising a plurality of consecutive display lines each of which includes a plurality of individual pixels for visually displaying the solid object, pixel memory means comprising:

a first set of pixel storage means including, first z-buffer means (F) for storing a depth representation of a front face associated with one of the subsolids;

second z-buffer means (B) for storing a depth representation of a back face associated with the subsolid; and first intensity buffer means (T) for storing a representation of an intensity of illumination reflecting from the front face associated with the subsolid;

the pixel memory means further comprising a second set of pixel storage means including, third z-buffer means (Z) for storing a depth representation of the front face of S; and second intensity buffer means (I) for storing a representation of an intensity of illumination reflecting from the front face of S.

9. A system as set forth in claim 8 and further comprising means, coupled to the first and the second set of pixel storage means, for processing subsolids of the CSG tree structure, the processing means comprising:

means for determining from the CSG tree structure at least one z-connected product associated with a subsolid of S;

means for determining a depth of points associated with the front face of the subsolid and for storing within F the determined depths of the front face;

means for determining a depth of points associated with the back face of the subsolid and for storing within B the determined depths of the back face;

means for determining an intensity of points associated with the front face of the subsolid and for storing the determined intensities in T; and means for storing in Z and I, for each processed subsolid, an updated representation of depth and intensity for the front face of S.

10. A system as set forth in claim 9 comprising a plurality of first sets of pixel storage means.

11. A system as set forth in claim 10 wherein the processing means includes means for sequentially processing at least one display line of pixels at a time.

12. A system as set forth in claim 10 wherein the processing means includes means for simultaneously processing substantially all lines of pixels at one time.

13. A system as set forth in claim 8 wherein, at least for a solid represented by the CSG tree structure as a union of differences of two z-connected products, the first set of pixel memory means further comprises fourth z-buffer means and third intensity buffer means.

14. In a system for modelling a solid object comprised of one or more subsolids related by a Constructive Solid Geometry (CSG) tree structure, the modelled solid (S) having, relative to a viewpoint, front and back faces disposed along a z-axis which is substantially parallel to a line-of-sight from the viewpoint, the system including a display means comprising a plurality of consecutive lines each of which includes a plurality of individual pixels for visually displaying the modelled solid, a method of operating the system comprising the steps of:
(a) determining from the CSG tree structure at least: one z-connected product associated with a subsolid of S;
(b) determining a depth of points associated with a front face of the subsolid;
(c) storing, in a first z-buffer means (F), the determined depth of points of the front face associated with the subsolid;
(d) determining a depth of points associated with a back face of the subsolid;
(e) storing, in a second z-buffer means (B), the determined depth of points of the back face associated with the subsolid;
(f) storing, in a first intensity buffer means (T), a representation of an intensity of illumination reflecting from points on the front face associated with the subsolid;
(g) comparing the stored depths of points in F to at least corresponding stored depths of points in a third z-buffer means (Z), the stored depths in Z being associated with points on the front faces of S, to determine which ones of the depths of points stored in F, if any, lie in front of the corresponding depths of points in Z; and
if any of the depths of points stored in F are determined to lie in front of the corresponding depths of points stored in Z,
(h) replacing the depth of the point or points in Z with the depth of the corresponding point in F; and
(i) replacing the intensity value of the point or points in a second intensity buffer (I) with the intensity of the corresponding point in T, the stored intensity values in I being associated with points on the front faces of S.

15. A method as set forth in claim 14 wherein the steps (a) through (i) are performed sequentially on a pixel by pixel basis.

16. A method as set forth in claim 14 wherein the steps (a) through (i) are performed simultaneously for each pixel within at least one line of pixels.

17. A method as set forth in claim 14 wherein the steps (a) through (i) are performed simultaneously for each pixel within substantially all of the lines of pixels.

18. In a data processing system for processing three-dimensional objects represented by a Constructive Solid Geometry (CSG) tree representation, a method of detecting an interference or a difference between two objects, comprising the steps of:
generating a list of z-connected sweeps grouped into z-connected products by performing for each product the steps of
initializing a first z-buffer means (F) to a predetermined minimum depth and a second z-buffer means (B) to a predetermined maximum depth;
for each primitive of the product,
scan converting front sweeps of the primitive to determine depths associated with points on the front sweeps;
comparing the depths of the front sweeps to corresponding depths in F and, for any depth which is greater than the corresponding depth in F, storing the depth in F;
scan-converting back sweeps of the primitive to determine depths associated with points on the back sweeps;
comparing the depths of the back sweeps to corresponding depths in B and, for any depth which is less than the corresponding depth in B, storing the depth in B;
the method further comprising the steps of:
comparing the depths stored in F to the depths stored in B; and, if a depth stored in F is less than a corresponding depth stored in B,
indicating the existence of a non-empty z-connected product.

* * * * *